United States Patent [19]

Edixhoven

[11] 4,073,044

[45] Feb. 14, 1978

[54] APPARATUS FOR ASSEMBLING LOUVRED BLINDS

[75] Inventor: Gerardus Hendrikus Edixhoven, Voorschoten, Netherlands

[73] Assignee: Hunter Douglas International N.V., Willemstad, Netherlands Antilles

[21] Appl. No.: 711,446

[22] Filed: Aug. 4, 1976

[30] Foreign Application Priority Data

Aug. 8, 1975 Germany ............................ 2535453

[51] Int. Cl.[2] .......................................... B23P 19/04

[52] U.S. Cl. .................................................. 29/24.5

[58] Field of Search ........................................ 29/24.5

[56] References Cited

U.S. PATENT DOCUMENTS

| | | | |
|---|---|---|---|
| 2,874,447 | 2/1959 | Rosenbaum | 29/24.5 |
| 2,917,810 | 12/1959 | Wilson | 29/24.5 |
| 3,521,337 | 7/1970 | Peeters | 29/24.5 |
| 3,531,838 | 10/1970 | Peeters | 29/24.5 |
| 3,613,193 | 10/1971 | Westberg | 29/24.5 |
| 3,736,631 | 6/1973 | Edixhoven | 29/24.5 |

*Primary Examiner*—Travis S. McGehee
*Assistant Examiner*—Horace M. Culver
*Attorney, Agent, or Firm*—Pennie & Edmonds

[57] ABSTRACT

The invention relates to an apparatus for assembling the louvres of louvred blinds to the supporting ladders and elevating members and includes a vertically disposed flap pivoted at its bottom and having a ladder guide along one face. A louvre is inserted horizontally between the two vertical stringers and between two adjacent rungs thereof. The flap lying to one side holds the ladder obliquely such that the rung above the louvre is to one side of a hole therethrough. The louvre is then lifted and a vertical needle for inserting an elevating member such as a cord or chain enters the hole as the louvre is lifted. This lifting motion also lifts the ladder which motion causes the flap to pivot and flip to a position on the other side of the hole so that the next successive rung will be on the other side of the hole and the needle. The assembly continues and results in the rungs of the ladder being disposed alternately on opposite sides of the elevating member.

13 Claims, 5 Drawing Figures

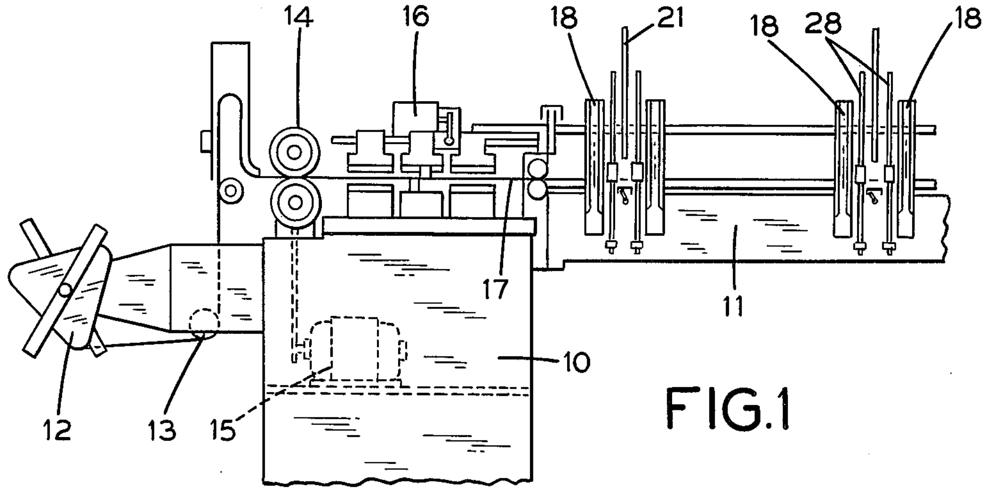
FIG.1
FIG.2
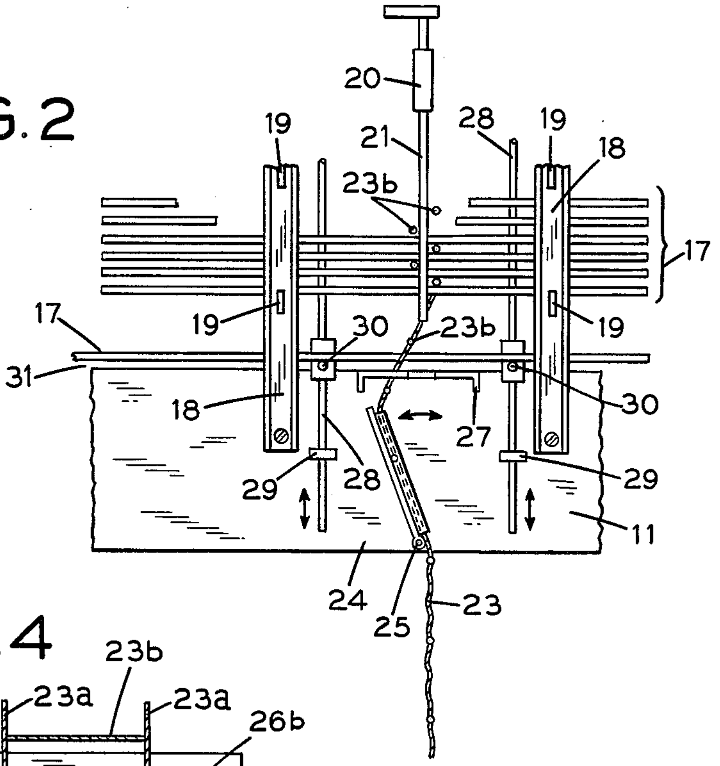
FIG.4
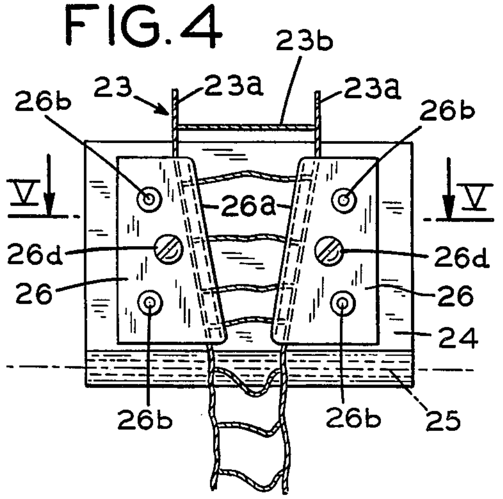
FIG.5
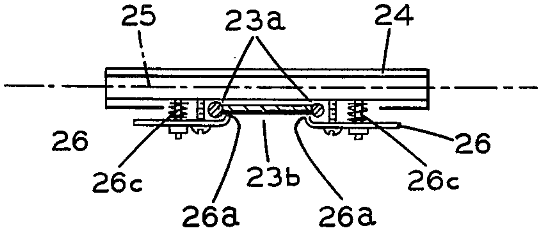

APPARATUS FOR ASSEMBLING LOUVRED BLINDS

PRIOR ART DEVICES

In order to arrange the rungs of the ladder of a louvred blind appropriately in relation to the elevating member, which in most cases will be a cord, but may alternatively consist of a chain, it is known that use may be made of a device having two pivoted gripping arms alternately resting against successive rungs on either side of the ladder in more or less horizontal direction. The arms are of such shape that in this rest position, they deflect the ladder somewhat out of the vertical position to an oblique position, relative to the ladder, so that the portion of the ladder located between two successive rungs is in oblique position prior to each stepwise lifting of the ladder. As guiding member, in most cases a needle is employed, to which the elevating member may already be attached at the beginning of this assembly operation. Since the position of the successive rungs is in each case fixed by the presence of the needle, the elevating member may alternatively if necessary not be attached to the needle until all rungs of the ladder have alternately been passed on either side of the needle by the lifting of the louvres.

When the ladder is lifted, one rung at a time will pass the tip of the needle, the arm located on one side of the ladder releasing the rung hitherto held by it, while the arm on the other side of the ladder can make contact with the next rung. The latter thus draws the ladder into the other oblique position, so that the next rung can now pass on the other side of the needle. In order for the arms to return to horizontal position quickly enough after the lift, appropriately acting springs are provided. So that the rungs of the ladder will be drawn at least more or less straight prior to this assembly, a stationary spreading means is arranged below the arm.

This contrivance has the disadvantage of being comparatively expensive to construct. Also, the design of the arms and the dimensioning of the springs are critical, especially in reasonably fast operation, if the process is to run smoothly. Furthermore, the arms to be arranged transverse to the plane of the ladder require considerable additional space, which is further increased by the space required for the spreading means.

From this point of departure, the object of the invention was to construct an arrangement of the kind above mentioned in such manner that the alternating oblique positioning of the ladder in opposed directions might be accomplished by simpler means and even more dependably.

SUMMARY OF THE INVENTION

The invention relates to an apparatus for assembling louvred blinds having louvres with vertically aligned holes for passage of an elevating member, having at least two suspension members each in the form of a ladder comprised of two stringers and rungs connecting the stringers, each rung holding and supporting a louvre near a hole, therethrough, having a means with a needle for passing the elevating member through the holes and the ladder in such manner that successive rungs lie alternately on opposed sides of the elevating member, and having a ladder guide actuable by lifting the ladder step by step which guide serves to deflect the free end of the ladder, with each successive rung not yet engaged by the elevating member and the needle, alternately into different oblique positions relative to the needle held vertical.

When the successive rungs thus alternately rest against the elevating member on either side, the louvres and the ladders are secured in horizontal direction in relation to each other, so that the louvres cannot slip laterally out of the ladder.

More specifically, it is proposed, according to this invention, that the guide actuable by the lifting of the ladder comprise a flap pivoted on a horizontal axis and that the ladder be guided on the flap at a level located above the axis of the pivot. The pivoted flap itself being located below the means for threading the elevating member and the plane of entry of the louvres.

When the ladder is in one of its two oblique positions in its guide on the flap, then upon lifting of the ladder there will regularly be a certain amount of friction between the ladder on the one hand and the guide and/or the flap on the other hand. The discovery of the invention is that this friction suffices to bring the flap into top dead center position through the stepwise lifting of the ladder. The flap is thus supplied with a certain kinetic energy quite sufficient to move the flap past dead center into the other oblique position, with the further assistance, once the dead center has been passed, of the dead weight of the flap.

The two extreme positions of the flap may be fixed at suitable points by means of stops or suitable limitation of rotation of the pivot.

On the basis of the proposed construction, the invention may be embodied with but little technical outlay. There are no difficulties in the dimensioning and design of any restoring forces, lever arms or the like. On the contrary, the speed of swing of the flap will of its own accord adapt itself to the speed at which the ladder is lifted, for if the ladder is lifted faster, the flap will swing faster also. Furthermore, the invention provides absolute dependability in the alternation of the oblique positions of the ladder. The center of gravity of the flap should be above the pivot.

In further refinement of the invention, it is proposed that the flap itself shall have two guiding members, each associated with one stringer of the ladder and arranged at a distance from each other corresponding to the length of a rung. It thus becomes superfluous to provide a similar spreading means with guiding members elsewhere, which would otherwise require additional technical outlay and additional space. The guide members may consist of two plates with rails diverging obliquely from below upward. The spreading of the stringers, as usually required, to a more or less horizontal and straight position of the rungs, may thus be achieved by simple means and with a minimum space requirement. To this is added the advantage that the simultaneous spreading of the ladder increases the friction between it and the guiding and/or spreading members, so that a correspondingly greater component of force can be transmitted to the flap when the ladder is lifted. Thus any further measures to obtain adequate friction are superfluous. Proper design will even eliminate the need of limiting the extreme swing of the flap with stops or by other means.

In further refinement of the invention, it is proposed that a guiding member be arranged above the flap, against which the ladder will bear in horizontal direction under the pressure exerted by the flap. Since the ladder is already spread above the flap, the guiding member may suitably be so fashioned that it may simultaneously perform a guiding function for the several louvres as they are inserted.

The guiding member may advantageously consist of a frame cut out in the middle, the width of the cut-out determining the horizontal range of deflection of the ladder. The ladder will thus alternately come to rest at one of two opposed interior sides of the cut-out, while in one of the remaining sides, a slit may appropriately be provided, through which the ladder can be slipped in and out.

Further, it is proposed that the guiding member or frame shall have a projection between each pair of points of contact for the stringers of the ladder, to serve as a hold-down for the rung. This permits insertion of the louvres along the top side of the guiding member, without danger that so much as a portion of the rung will protrude above this plane of insertion. By this construction of the guiding member, incidentally, the maximum friction required to hold the ladder, which friction must be developed by the guide members on the flap, is diminished.

BRIEF DESCRIPTION OF THE DRAWINGS

In the following, an embodiment of the invention will be described in more detail by way of example, with reference to the drawings in which:

FIG. 1 shows a schematic elevation of a portion of a machine for making the louvres and which is directly adjacent an assembly device, including the invention, for making up the packs of louvres;

FIG. 2, to a larger scale, shows a portion of FIG. 1 in more detail;

FIG. 4 shows a view of a flap incorporating a spreading means; and

FIG. 5 shows a section at the line V—V in FIG. 4.

DETAILED DESCRIPTION OF THE INVENTION

Figure 3:
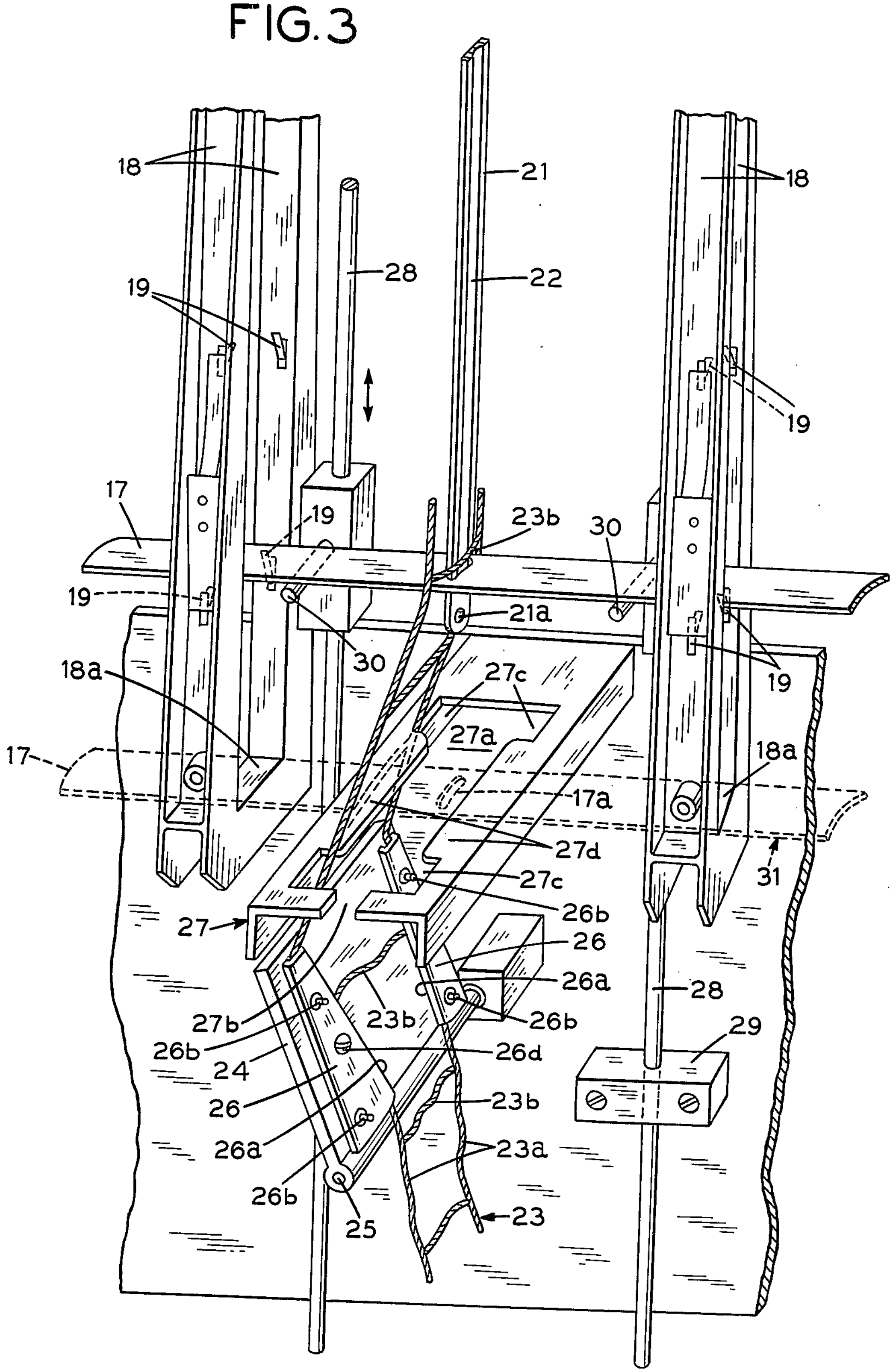
FIG. 3, to a still larger scale, shows a pictorial view of a portion of FIG. 2 in more detail.

The device comprises machine platform 10 and an assembly rack 11. On the platform 10 is mounted a supply reel 12 of coiled sheet metal for louvres. This is passed by way of rollers 13 to a first pair of rolls 14 driven by a motor 15. The strip of sheet then passes through a fixture 16 in which it is straightened and formed. Also in fixture 16, the holes required for threading an elevating member are punched and the strips of sheet metal are trimmed to the particular desired length, thus completing the several louvres 17. The parts directly associated with the machine platform 10, however, do not belong to the invention.

The assembly rack 11 has two vertical U-shaped suspensions 18 of clear inside width so dimensioned as just to match the width of a louvre 17. On the inner sides of the suspensions 18 there are spring stops 19 which project into the space between the legs of the "U" of suspensions 18 under the urging of springs. When a louvre 17 is lifted upward it forces the stops 19 outward against the springs and thus the louvre 17 passes by the stops 19. When the louvre has thus passed above the stops 19 the springs then again urge them inward where they project into the space between the legs of the "U" of the suspensions 18 and may then serve as support for the louvres 17 thereabove.

In the upper part of the assembly rack 11, a fixture 20 is arranged for holding and guiding a needle 21 in vertical direction. The louvres 17 are each so inserted in the suspensions 18 that their holes **17*a*, punched on the machine platform 10 for receiving an elevating member, lie exactly beneath the needle 21. The elevating member is a cord, not shown here, which may be attached to the tip 21*a* of the needle 21 when all louvres 17 required for one louvre pack have been properly assembled with the ladder 23. As a conceivable modification, however, the needle 21 may have a lengthwise recess 22** in which a cord to serve as elevating member may already be contained before assembly is begun.

The several louvres 17 of the blind are held by a ladder 23 preferably, but not necessarily, made up of cords. If the length of the louvres is not great, two ladders 23 will be sufficient; however for blinds having longer louvres, three or more ladders might be provided, more or less evenly spaced over the louvre length. For clarity and simplicity, only one assembly unit has been shown in FIGS. 2 and 3 but it will be evident to those skilled in the art that there must be a unit for each ladder all operating simultaneously each of which will be identical to the unit shown.

Each ladder 23 comprises two stringer cords **23*a* and rung cords 23*b* connected between them and arranged at uniform intervals between the stringers 23*a*; these intervals determine the distance between adjacent louvres 17** one above another when the blind is lowered.

Beneath the needle 21, a flap 24 is arranged, connected to the assembly rack 11 and pivoting on a horizontal axis 25 parallel to the plane of the ladder 23. The flap 24 is provided on one face with two guide plates 26 flanged at the sides. These are so shaped and mounted on the flap 24 that the stringers **23*a* of the ladder 23 can glide between the flap 24 and the plate 26. On their facing sides, the plates 26 have guide rails 26*a* bent towards the flap 24, not touching the flap 24, however, but leaving enough clearance so that the rungs 23*b* can pass between the ends of the rails 26*a* and the flap 24. This distance may be adjusted as will now be described. The guides 26 are mounted on pins 26*b* fixed to flap 24 and passing through holes in guides 26. Springs 26*c* urge the guides 26 away from flap 24 and against the heads of pins 26*b* as well as against the underside of the heads of screws 26*d*. Rotation of screws 26*d* adjusts the distance of rails 26*a* from flap 24. The stringers 23*a* are nevertheless held by the rails 26*a*, being of greater diameter than the rungs 23*b*. The rails 26*a* diverge from below upward, so that they can spread the stringers 23*a* of the ladder 23 so far that the rungs 23*b*** will assume a straight and more or less horizontal position.

Above the flap 24, more or less at the level of the middle webs **18*a* of the suspensions 18, a guiding member in the form of a frame 27 is provided, the middle cut-out 27*a* of which is accessible from the outside through a slit 27*b*. On two opposed inner sides of the frame 27, notches 27*c* are provided at a spacing corresponding to the width of the ladder 23, forming the actual points of contact for the stringers 23*a*, while in between the two notches 27*c* on each side there is a projection 27*d* holding down one rung 23*b* at a time when the stringers 23*a* of the ladder 23 are in contact with one or the other side of the cut-out 27*a* inside the notches 27*c*** therein.

The louvres 17 are lifted by a known lifting means, not belonging to the invention, by means of which the louvres 17 may be lifted to a point above the lowest set of spring stops 19. Nothing of this lifting means is here shown but vertical rods 28 in slide bearings 29 with pins 30 to pick up the louvres 17.

The mode of operation of the device described is as follows.

The cord (not shown) serving as elevating member is secured by its lower end to the tip 21a of the needle 21 and otherwise held in any suitable manner. The upper end of the ladder 23 is secured to the top bar, here not shown, of the blind, or to one of the louvres 17, as indicated in FIG. 3. The ladder is slipped under the guide plates 26 of the flap 24, the position of each plate 26 in relation to the flap 24 being predetermined by means of the previously described adjustment of screws 26d. A free rung 23b is thus located as indicated in FIG. 3 below the left projection 27d of frame 27. Two rungs above this is the last rung 23b as yet assembled. This rung is held by the lower end of the needle 21 and is in contact on the right-hand side of the needle. Between these two rungs 23b there is another, intermediate rung 23b deflected to the left in relation to the lengthwise axis of the needle 21.

By suitable control and actuation of motion producing devices associated with the machine platform 10, one louvre 17 at a time of proper length is inserted in the assembly rack 11, each one of a set of openings 17a being located exactly beneath a needle 21. The ladder 23 assumes the obliques position to be seen in FIGS. 2 and 3, due to the position of the flap 24.

The flap 24 is in the same position in each of FIGS. 2 and 3; however, several louvres 17 are shown already assembled in FIG. 2 so that the alternating positions of the rungs 23b may be seen.

Before a louvre 17 is supplied, first the lifting pins 30 must be lowered into their lowermost position underneath the insertion plane 31. Then a louvre 17 is inserted through the ladder in plane 31 as shown in FIGS. 2 and 3. The top surface of guide frame 27 aids in the proper insertion of the louvre 17 as the projection 27d holds down the next rung 23b.

After insertion of a new louvre 17, the lifting pins 30 are lifted; such lifting will lift the louvre 17, but will remain without effect on the ladder 23 until the louvre 17 has engaged beneath the next rung 23b above (i.e. the intermediate rung mentioned above). Only then will the ladder 23 be lifted. Upon further lifting, this rung 23b will pass by the tip 21a of the needle 21 on the left side of the needle, thereby fixing its correct position in relation to the elevating member to be afterwards brought in with the needle 21. At the same time, the flap 24 is carried along by the ladder 23 towards top dead center by virtue of the friction between the two. The flap 24 thereby gains a certain kinetic energy, or a certain angular velocity. When the bottommost louvre 17 has been lifted so far that it is secured against dropping back downward by the lowest set of spring stops 19 (as shown in the full line position of a louvre 17 in FIG. 3), the lifting pins 30 are arrested. The flap 24 continues its swinging motion by virtue of its kinetic energy, and after passing top dead center drops into its right-hand position. Thus the stringers 23a of ladder 23 come to rest in the notches 27c of frame 27 on the right-hand side of cut-out 27a. That rung 23b which ran along underneath the left-hand projection 27d before the lift is now on the right-hand side of the lengthwise axis of the needle and about midway between the louvre 17 just lifted and a next rung 23b below which runs along underneath the right-hand projection 27d.

The lifting pins 30 are now lowered again into their extreme bottom position. Assembly of the next louvre 17 may be repeated, whereupon the flap 24 is returned from its right-hand into the left-hand position. The lifting of a newly inserted louvre from the plane 31 upward to the point, and somewhat beyond, that the needle 21 enters the hole 17a is equivalent to almost twice the distance between adjacent rungs 23b of the ladder. However, in each such lift the ladder itself will be raised only the distance between two adjacent rungs 23b. This is due to the fact, mentioned above, that the first portion of the upward movement of the louvre 17 from the plane 31 to engagement with the next rung 23b thereabove does not move the ladder.

This lifting is accomplished mechanically, optionally including the control of corresponding movements in the control of the systems associated with the machine platform 10. Alternatively, of course, the program of the several movements in the area of each of the ladders 23 present in any instance may be included in a common control.

As will be understood by those skilled in the art, the terms louvres and louvred blinds, as used above, are generic and refer to various structures which are called commonly by a variety of different terms. One specific commonly used term for certain of such louvred blinds is "Venetian" blinds in which the louvres are commonly referred to as "slats". While such structures are contemplated as falling within the invention above described, it is clearly not limited solely thereto.

I claim:

1. The method of assembling louvred blinds having louvres with holes therein, an elevating member, and a ladder having a pair of stringers with a plurality of rungs extending between said stringers comprising positioning a needle for threading the elevating member through holes in the louvres with the longitudinal axis of said needle vertical, guiding and positioning the ladder by means of a pivoted flap in guiding relationship with the ladder, inserting louvres successively between adjacent rungs of said ladder, raising each successive louvre after its insertion in said ladder to pass said needle through a hole in the louvre, raising of a louvre effecting upward movement of the ladder during at least a portion of the raising movement of the louvre, pivoting said flap to and between a first position in which said flap positions said ladder with a rung to one side of the vertical axis of said needle and a second position in which said flap positions the next successive rung of the ladder to the other side of said axis, and effecting the pivoting of said flap solely and directly by forces exerted on said flap by said ladder during upward movements of said ladder.

2. An apparatus for assembling louvred blinds having louvres with holes therein, an elevating member, and a ladder having a pair of stringers with a plurality of rungs extending between said stringers, said apparatus comprising a vertically disposed needle for threading the elevating member through holes in the louvres, means for raising each successive louvre after its insertion between two adjacent rungs of the ladder to pass said needle through a hole in the louvre, at least a portion of the raising movement of a louvre effecting upward movement of said ladder, means for guiding the unassembled portion of the ladder, said guiding means including a pivoted flap in guiding relationship with the ladder, said flap being movable solely and directly by said ladder during the intermittent upward movement of said ladder to and between a first position in which said flap positions a rung of the ladder to one side of the vertical axis of said needle and a second position in which said flap positions the next succeeding rung to the other side of said axis.

3. The apparatus of claim 2 in which a portion of said flap is in guiding relationship to said ladder and is positioned above the pivot axis of said flap.

4. The apparatus of claim 3 in which said pivoted flap is located below said needle and also below the plane of insertion of louvres into said ladder.

5. The apparatus of claim 4 in which the center of gravity of said flap is positioned above the pivot axis of said flap.

6. The apparatus of claim 5 in which the guiding surface of said flap has two guide members each being in guiding engagement with one of said stringers of the ladder.

7. The apparatus of claim 6 in which the upper end of said guide members are arranged at a distance from each other corresponding to the length of a rung.

8. The apparatus of claim 7 in which said guide members include means for spreading said stringers apart by a distance corresponding to the length of the rung.

9. The apparatus of claim 8 in which said means for spreading the stringers comprises a guide flange on each of said guide plates extending toward the facing surface of said flap, and said guide flanges diverging upwardly from each other.

10. Apparatus of claim 9 in which said guide flanges are spaced from said surface of said flap by a distance substantially corresponding to the thickness of the rungs.

11. The apparatus of claim 2 including a guiding member above said flap, an opening through said guiding member through which said ladder passes, and said ladder alternately bearing against one then the other of two opposite sides of said opening under pressure exerted by said flap.

12. The device of claim 11 in which said two opposite sides of said opening each has a projection extending toward the projection from the other thereof said projections alternately serving to hold down successive rungs of said ladder.

13. The apparatus of claim 12 in which the dimensions of said opening determine the amount of deflection of the ladder.

* * * * *